Aug. 15, 1961     R. G. HOLLINGER     2,996,171
CONTACT LENS COMFORT CASE
Filed Dec. 20, 1960
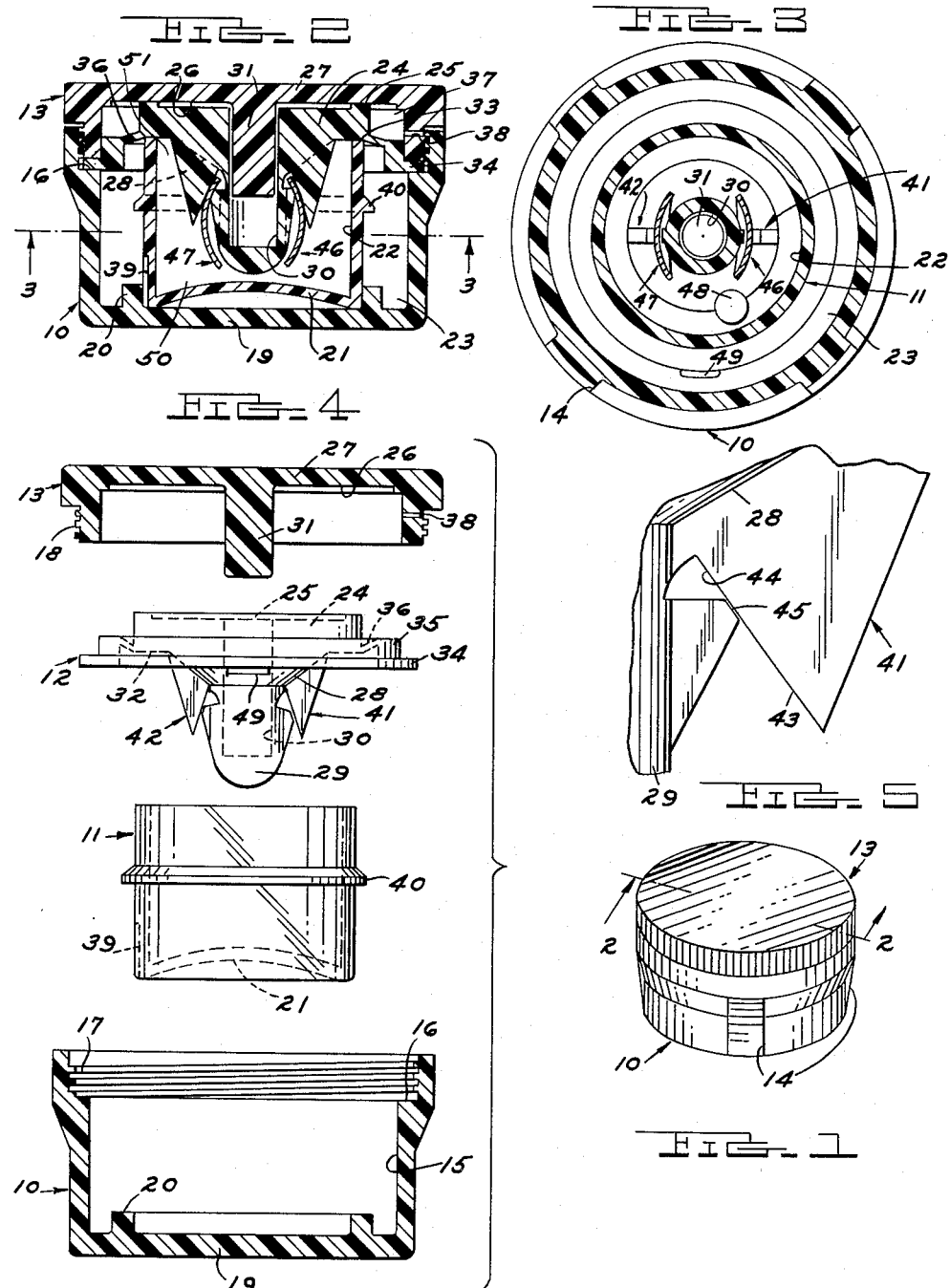
INVENTOR.
RICHARD G. HOLLINGER
BY
ATTORNEYS United States Patent Office 2,996,171
Patented Aug. 15, 1961

2,996,171
CONTACT LENS COMFORT CASE
Richard G. Hollinger, 10745 Kingston,
Huntington Woods, Mich.
Filed Dec. 20, 1960, Ser. No. 77,182
9 Claims. (Cl. 206—5)

This invention relates to a novel and improved contact lens carrying case which is adapted to securely hold the lenses in a soaking chamber filled with a solution and to maintain complete submersion of the lenses in any position of the case.

It is important in the contact lens art to keep the lenses wet when not in use to prevent eye fluid secretions on the lenses from drying and caking thereon. Many attempts have been made in the past to provide contact lens carrying cases which hold the lenses in a solution but such cases have been unsatisfactory due to leakage of the same whereby the lenses are not maintained in a wet condition. Accordingly, it is the primary object of the present invention to provide a contact lens carrying case which is constructed to be completely leak proof regardless of temperature changes while maintaining the lenses in a complete wet condition.

It is another object of the present invention to provide a contact lens carrying case which is simple and compact in construction, economical of manufacture, leak proof, shock resistant, light in weight, and small in size to permit carrying of the case in a women's handbag or in a man's pocket.

It is a further object of the present invention to provide a contact lens carrying case which incorporates an inner solution well or chamber that is surrounded by an overflow chamber, and a cover which carries an insert for holding the lenses, whereby, the inner chamber may be completely filled with solution and when the cover is placed on the body of the case the lenses will be extended down into the solution and the solution displaced thereby will be caught in the overflow chamber leaving the center chamber completely full of solution. The lens-holding insert is provided with a pressure equalizing diaphragm and gasket means to prevent leakage from the center chamber and from the case itself when the cover is mounted in place on the body of the case.

It is still another object of the present invention to provide a contact lens carrying case which is constructed and arranged so that the lenses may be easily and positively placed in holders formed in the insert member without having the contact surfaces of the lenses touched by the user when they are put into or removed from the case, so that the lenses will not stick to the fingers of the user.

Other objects, features and advantages of this invention will be apparent from the following detailed description and appended claims, reference being had to the accompanying drawing forming a part of the specification wherein like reference numerals designate corresponding parts of the several views.

In the drawing:

FIG. 1 is a perspective view of a contact lens carrying case embodying the principles of the invention;

FIG. 2 is an elevational sectional view of the structure illustrated in FIG. 1, taken along the line 2—2 thereof and looking in the direction of the arrows;

FIG. 3 is a horizontal sectional view of the structure illustrated in FIG. 2, taken along the line 3—3 thereof and looking in the direction of the arrows;

FIG. 4 is an exploded view of the structure illustrated in FIG. 2, showing the relationship of the various parts of the case and how they are assembled; and FIG. 5 is an enlarged fragmentary view of a portion of the lens-holding insert member showing a lens-holding seat.

Referring now to the drawing and in particular to FIGS. 1 and 4, the lens carrying case of the present invention is illustrated as generally comprising the body member 10, the inner solution chamber 11, the lens holding insert 12, and the cover 13. The body 10 is tubular in construction and is open at the top end thereof and closed at the bottom end thereof. The body 10 and the cover 13 may be made from any suitable material as, for example, a plastic material such as acrylic plastic. The body 10 is provided with the finger notches 14 around the periphery thereof to permit efficient gripping of the body 10. The body 10 is provided with the interior or inner chamber wall 15 which extends upwardly and is enlarged at the upper end thereof to form the annular sealing lip 16. As shown in FIGS. 2 and 4, the body 10 is provided with the female threaded portion 17 for mating engagement with the male threads 18 on the cover 13.

Extended upwardly from the bottom wall 19 of the body 10 is a centrally disposed annular flange 20 in which is releasably seated the inner solution chamber 11. The inner solution chamber 11 is formed as a cylinder and it is enclosed at the lower end thereof with a bottom end wall indicated by the numeral 21. The inner chamber cylinder 11 may be formed from any suitable material as, for example, a plastic material as polyethylene plastic. The inner chamber formed by the cylinder 11 is indicated by the numeral 22 and this chamber would be filled with a suitable contact lens solution. The space 23 around the cylinder 11 is indicated by the numeral 23 in FIG. 2 and this space may be termed an overflow chamber.

As shown in FIGS. 2, 3 and 4, the lens holding insert 12 is adapted to be detachably carried by the cover 13. The lens holding insert 12 may be made from any suitable resilient and flexible material such as silicone plastic and rubber. The insert 12 comprises the circular base portion indicated by the numeral 24 and this base portion is provided with the annular flange 25 around the upper end thereof which is adapted to abut against the inner side 26 of the cover wall 27. As shown in FIGS. 2 and 4, the insert base portion 24 extends downwardly and has an inwardly tapered surface or shoulder indicated by the numeral 28 which terminates in the downwardly vertically extended, centrally disposed, elongated portion 29 which has a lower rounded end. The insert base portion 24 is provided with a centrally disposed bore 30 which extends inwardly and downwardly from the upper end thereof and in which is slidably received the centrally formed guide post 31 which is formed integral with the cover wall 27.

As shown in FIGS. 2 and 4, the insert base portion 24 provided with an annular flat surface 32 on the lower side thereof around the tapered shoulder 28. The flat surface 32 forms a sealing seat or surface against which the upper end 33 of the cylinder 11 abuts in sealing engagement when the cover 13 is mounted in place on the body 10. The insert member 12 is provided with a second sealing means in the form of the peripheral flange 34 which is carried by the integral inwardly disposed cylindrical portion 35. The annular portion 35 is integrally connected to the insert base portion 24 by means of the diaphragm indicated by the numeral 36. As shown in FIG. 2, the sealing flange 34 is adapted to be seated between the cover threaded portion 18 and the seat 16 on the body 10. It will thus be seen that the carrying case of the present invention is provided with a double seal to prevent leakage from the inner chamber 22. As shown in FIG. 2, the annular space 37 between the insert 12 and the cover 13 is vented to the atmosphere by means of the passage 38. It will be seen that the foregoing structure provides a leakproof lens carrying case regardless of the changes of the solution pressure in the inner chamber 22 caused by temperature changes. For example, if the user puts fresh solution in the chamber 22, this solution is at room temperature and it will soon warm up and the temperature will rise due to the heat of the user's body. Since the inner chamber 22 is fully loaded, whenever this situation occurs the solution pressure will rise and the flexible diaphragm 36 will permit the base portion 24 to be moved upwardly slightly to allow sufficient overflow from the inner chamber 22 to the overflow chamber 23 to relieve the increased pressure in the chamber 22. The fact that the compartment 37 is vented to the atmosphere also aids in assisting the last mentioned overflow action.

As shown in FIGS. 2 and 4, the inner cylinder 11 is provided with a vertical, longitudinal extended recess or slot 39 on the lower end thereof. The slot 39 functions to permit the air to be evacuated from the space inside of the flange 20 in the body 10 when the cylinder is mounted within the flange 20 to provide for quick and easy mounting and removal of the cylinder 11 and prevent any suction effect between cylinder 11 and the body 10. The provision of the slot 39 in the cylinder 11 insures accurate and full seating of the cylinder within the flange 20. The cylinder 11 is further provided with an outwardly extended peripheral shoulder 40 which functions as a solution level indicator for the overflow chamber 23. The maintaining of solution in the overflow chamber below the level indicator 40 will insure the user that no solution will escape through the threads between the body and the cover by means of capillary action.

The solution level indicator 40 may also be employed to indicate to the user that he may store fresh solution in the overflow chamber up to this level indicator for future use for a second refilling of the submersion chamber 22. For example, if the user is going on a short trip he may fill the submersion chamber 22 with fresh fluid and the overflow chamber 23 with fresh fluid up to the indicator level 40. The fluid in the inner chamber 22 may then be removed after an appropriate time and this chamber refilled by the fluid contained in the overflow or storage chamber 23.

The insert 12 is provided with the following described lens holding means which is adapted to hold the lenses in a position which is as close as possible to the geometric center of the submersion chamber 22. As shown in FIGS. 2, 3 and 4, the insert 12 is provided with a pair of diametrically oppositely disposed vanes 41 and 42 which are disposed on opposite sides of the elongated member 29, and which are integral with the member 29 and terminate at the tapered shoulder 28. Each of the vanes 41 and 42 are provided with inwardly extended cuts to provide a lens holding means in each of these vanes. As shown in FIG. 5, the outer edge of the vane 41 has a triangularly shaped portion removed therefrom to provide the triangular recess indicated by the numeral 43. A triangularly shaped portion is also removed from the vane 41 as indicated by the numeral 44. The outer side of the opening 44 is formed in alignment with the outer side of the recess 41 and these tapered sides are joined by a cut made through the vane at the point indicated by the numeral 45. The length of the cut 45 is approximately $\frac{1}{16}$ of an inch in length, and since the vane 41 is also approximately $\frac{1}{16}$ of an inch in thickness, a lens inserted through the cut 45 would be engaged on either side thereof by a holding surface equivalent to an area $\frac{1}{16}$ of an inch square. As shown in FIG. 2, the inner end of the lens 46 is extended into the opening 44 and the outer edge of the lens 46 extends downwardly into the solution in the chamber 22 without touching the elongated member 29.

The other lens 47 would be held in the other lens holding means in the vane 42 in a similar manner. As shown in FIGS. 3 and 4, when the cover 13 is removed the right lens may be indicated by means of the circular spot 48 marked on the insert with a red color. A further means of identification may be provided on the insert as shown by the numeral 49 which indicates a projection integrally formed on the lower side of the insert tubular portion 35. The identifying projection 49 would be formed approximately $\frac{1}{16}$ of an inch high and $\frac{1}{8}$ of an inch long. The user of the case could readily identify the position of the right and left lens even if the case is being used in the dark by merely disposing the projection 49 towards himself whereby the right lens would be disposed to the right and the left lens would be disposed to the left.

The tapered shoulder 28 and the inwardly curved bottom wall 21 of the cylinder 11 cooperate to insure that the lenses 46 and 47 are completely submersed even when the level of the solution in the chamber 22 is below the upper edge of the cylinder 11. It will be seen that by having the lenses 46 and 47 disposed in approximately the geometrical center of the cylinder 11, any air bubbles caused by a lowering of the solution in the chamber 22 will be moved outwardly to the points 50 and 51 at the outer edges of the curved bottom wall 21 and tapered surface 28, respectively. The last mentioned structure insures that the lenses will be completely submersed even when the chamber 22 is less than full of the lens solution.

Experience has shown that the lens carrying case of the present invention is an efficient and practical case and that the lenses are securely held in place by a soft surgical rubber lens holding means formed in the vanes 41 and 42. In use, the soaking chamber 22 is filled with the lens solution and the lenses are totally dipped into the loose liquid, thus guaranteeing that the lenses will be completely submersed in any position of the case. The lens carrying case of the present invention is double sealed at the points 16 and 33 and vented to prevent leakage even in extreme air pressure changes. The lens holding means of the present invention provides even holding pressures on the lenses whereby all warpage of the lenses is prevented.

While it will be apparent that the perferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A contact lens carrying case, comprising: a tubular body closed at the lower end thereof and open at the upper end thereof; a centrally disposed chamber in said body for holding a lens solution; an overflow chamber in said body surrounding said first named chamber; a cover detachably mounted on the upper end of said body and enclosing the same in a water tight connection therewith; an insert member mounted on the inner side of said cover and being provided with a pair of contact lens holding means whereby when the cover is mounted on the body a pair of contact lens held in the lens holding means will be disposed inside of said first named chamber; and, said insert member being provided with means for sealing engagement with the upper end of the first named chamber and said body to provide a double seal for preventing leakage of the solution from the case.

2. A contact lens carrying case, comprising: a tubular body closed at the lower end thereof and open at the upper end thereof; a centrally disposed soaking chamber in said body for holding a lens solution; said soaking chamber having a lower end wall which is curved inwardly and upwardly into the chamber; an overflow chamber in said body surrounding said soaking chamber; a cover detachably mounted on the upper end of said body and enclosing the same in a water tight connection therebetween; an insert member mounted on the inner side of said cover and including a centrally disposed lens holding portion, a peripheral sealing member for sealing engagement between said cover and body, and a diaphragm interconnecting said lens holding portion and said sealing member; said centrally disposed lens holding portion having a sealing flange formed thereon for sealing engagement with the upper end of said soaking chamber; and, a pair of contact lens holding means on said lens holding portion for holding a pair of lens inside of said soaking chamber when said cover is mounted on said body.

3. A contact lens carrying case as defined in claim 2, wherein: said soaking chamber is separately formed from said body and comprises a cylindrical member which is open at the upper end thereof and enclosed at the lower end thereof by means of an inwardly and upwardly curved lower end wall; and, said body is provided with a centrally disposed, upwardly extended flange within which said cylindrical soaking chamber is disposed.

4. A contact lens carrying case as defined in claim 3, wherein: said soaking chamber is provided with a vertically disposed slot on the lower end thereof for venting purposes when the soaking chamber is assembled into said body.

5. A contact lens carrying case as defined in claim 2, wherein: said cover is provided with a vent passage to vent the space in the cover between the diaphragm and the upper end wall of the cover.

6. A contact lens carrying case as defined in claim 2, wherein: said centrally disposed lens holding portion is provided with a downwardly and inwardly tapered shoulder and a pair of diametrically spaced apart integral vanes which are each provided with one of the lens holding means.

7. A contact lens carrying case as defined in claim 6, wherein: each of said contact lens holding means in said vanes comprises an inner and outer triangularly shaped opening in each of said vanes and a slit in each of said vanes connecting said openings in the same.

8. A contact lens carrying case as defined in claim 2, wherein: said insert member is provided with means thereon for indicating the respective position of each of the lenses held thereon.

9. A contact lens carrying case as defined in claim 2, wherein: said overflow chamber is provided with means for indicating the maximum level of solution to be maintained in said overflow chamber.

No references cited.